United States Patent
Hess et al.

(10) Patent No.: US 12,212,136 B2
(45) Date of Patent: *Jan. 28, 2025

(54) SYSTEMS AND METHODS FOR PROVIDING POWER CONSUMPTION PREDICTIONS FOR SELECTED APPLICATIONS WITHIN NETWORK ARRANGEMENTS FEATURING DEVICES WITH NON-HOMOGENEOUS OR UNKNOWN SPECIFICATIONS

(71) Applicant: Citibank, N.A., New York, NY (US)

(72) Inventors: Adam Hess, Roanoke, TX (US); Dawid Orczyk, Pawlow (PL); Dominik Wojnarowski, Warsaw (PL); Krzysztof Andrzejewski, Warsaw (PL); Pawel Chrabonszcz, Nowa Iwiczna (PL)

(73) Assignee: Citibank, N.A., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/531,817

(22) Filed: Dec. 7, 2023

(65) Prior Publication Data

US 2024/0250529 A1    Jul. 25, 2024

Related U.S. Application Data

(63) Continuation of application No. 18/361,658, filed on Jul. 28, 2023, now Pat. No. 11,843,248, which is a continuation-in-part of application No. 18/157,781, filed on Jan. 20, 2023, now Pat. No. 11,747,782.

(51) Int. Cl.
*H02J 3/00*    (2006.01)

(52) U.S. Cl.
CPC ........... *H02J 3/003* (2020.01); *H02J 2203/20* (2020.01)

(58) Field of Classification Search
CPC ...... H02J 3/003; H02J 2203/20; G06N 3/048; G06N 3/0464; G06N 3/084; G05B 2219/2639; G05B 19/042
See application file for complete search history.

(56) References Cited

U.S. PATENT DOCUMENTS

| | | | | |
|---|---|---|---|---|
| 2004/0010785 A1* | 1/2004 | Chauvel | ............. | G06F 11/3419 717/148 |
| 2013/0268257 A1* | 10/2013 | Hu | ......... | G06F 30/20 703/22 |
| 2017/0026305 A1* | 1/2017 | Barrett | ................. | H04L 47/70 |
| 2019/0370141 A1* | 12/2019 | Choi | ................ | G06F 11/3075 |
| 2020/0313434 A1* | 10/2020 | Khanna | ................ | G06N 3/044 |

* cited by examiner

*Primary Examiner* — Chad G Erdman
(74) *Attorney, Agent, or Firm* — Foley & Lardner LLP

(57) ABSTRACT

Systems and methods are described herein for novel uses and/or improvements to artificial intelligence applications in an environment with limited or no available data. In particular, systems and methods are described herein for providing network arrangement recommendations based on power consumption predictions for selected applications within network arrangements featuring devices with non-homogeneous or unknown specifications.

20 Claims, 8 Drawing Sheets

220

| Unit | Power Consumption |
|---|---|
| Device 1a | 200Wh |
| Device 2a | 200Wh |
| Device 3a | 200Wh |
| Device 4a | 200Wh |
| Device 5a | 200Wh |
| Device 6a | 200Wh |
| Device 7a | 200Wh |
| Device 8a | 200Wh |
| Rack A (sum for devices 1a-8a) | 1600Wh |
| Device 1b | 200Wh |
| Device 2b | 200Wh |
| Device 3b | 200Wh |
| Device 4b | 200Wh |
| Device 5b | 200Wh |
| Device 6b | 200Wh |
| Device 7b | 200Wh |
| Device 8b | 200Wh |
| Rack B (sum for devices 1b-8b) | 1600Wh |
| Tech room 1 (sum for Racks A and B) | 3200Wh |

FIG. 2B

| Application | Unit | Power Consumption |
|---|---|---|
| Application A | Device 1a | 200Wh |
| Application A | 50% Device 2a | 100Wh |
| Application A | Device 3a | 200Wh |
| Application B | 50% Device 2a | 100Wh |
| Application B | Device 4a | 200Wh |
| Application C | Device 5a | 200Wh |
| Application D | Device 6a | 200Wh |
| Application E | 25% Device 7a | 50Wh |
| Application F | 75% Device 7a | 150Wh |
| Application F | Device 8a | 200Wh |
| | Rack A (sum for devices 1a-8a) | 1600Wh |

| Unit | Power Consumption | Efficiency |
|---|---|---|
| Device 1a | 200Wh | 1 switch port/1Wh |
| Device 2a | 200Wh | 1 switch port/10Wh |
| Device 3a | 200Wh | 1 GB of capacity/100Wh |
| Device 4a | 200Wh | 1 GB of capacity/80Wh |
| Device 5a | 200Wh | 1 virtual server of given config/10Wh |

280

| Application | Unit | Power Consumption | $CO_2$ emission |
|---|---|---|---|
| Application A | Device 1a | 200Wh | 200g/h |
| Application A | 50% Device 2a | 100Wh | 100g/h |
| Application A | Device 3a | 200Wh | 200g/h |
| Application B | 50% Device 2a | 100Wh | 100g/h |
| Application B | Device 4a | 200Wh | 200g/h |
| Application C | Device 5a | 200Wh | 200g/h |
| Application D | Device 6a | 200Wh | 200g/h |
| Application E | 25% Device 7a | 50Wh | 50g/h |
| Application F | 75% Device 7a | 150Wh | 150g/h |
| Application F | Device 8a | 200Wh | 200g/h |
| | Rack A (sum for devices 1a-8a) | 1600Wh | 1600g/h |

FIG. 2D

SYSTEMS AND METHODS FOR PROVIDING POWER CONSUMPTION PREDICTIONS FOR SELECTED APPLICATIONS WITHIN NETWORK ARRANGEMENTS FEATURING DEVICES WITH NON-HOMOGENEOUS OR UNKNOWN SPECIFICATIONS

CROSS-REFERENCE TO RELATED APPLICATION(S)

This application is a continuation of U.S. patent application Ser. No. 18/361,658, filed Jul. 28, 2023, which is a continuation-in-part of U.S. patent application Ser. No. 18/157,781, filed Jan. 20, 2023. The content of the foregoing applications is incorporated herein in its entirety by reference.

BACKGROUND

Artificial intelligence, including, but not limited to, machine learning, deep learning, etc. (referred to collectively herein as "artificial intelligence models," "machine learning models," or simply "models"), has excited the imaginations of both industry enthusiasts as well as the public at large. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. Given these benefits, the imagined applications for this technology seem endless.

However, despite these benefits and despite the wide-ranging number of potential uses, practical implementations of artificial intelligence have been hindered by several technical problems. First, artificial intelligence typically relies on training a model to make predictions and/or perform functions. Such training requires large amounts of high-quality data through which historical patterns may be detected. Additionally, the process for obtaining this data and ensuring it is high quality is often complex and time consuming. These technical problems present an inherent problem with attempting to use an artificial intelligence-based solution in environments with limited or no available data.

SUMMARY

Systems and methods are described herein for novel uses and/or improvements to artificial intelligence applications in an environment with limited or no available data. In particular, systems and methods are described herein for recommending network arrangements for devices with non-homogeneous or unknown specifications based on power consumption for selected applications.

For example, most computer applications rely on complex processes and technically diverse network arrangements. These network arrangements feature numerous non-homogeneous devices (e.g., devices with different hardware, configurations, software/operating systems, and/or other specifications). One of the features common to any computer equipment is its demand for the electrical energy required for its operation and the associated emission of carbon dioxide emitted into the atmosphere during the production of electricity. Along with growing environmental awareness and legal regulations, many entities are obligated to reduce carbon dioxide emissions. One of the many areas in which changes are expected is the information technology infrastructure, which is commonly indicated as an area generating high carbon emission values. In order to be able to make decisions in this regard, it is necessary to know the current electricity consumption and the associated carbon emission values for all components of the infrastructure.

However, this presents a severe technical challenge. For example, while it is possible to measure a current power consumption for a specific device (e.g., a single computer), a set of devices (a cabinet with several devices—in a server room "rack"), or entire dedicated areas (technical room, data center), it is difficult or even impossible to do so on the application level, particularly in complex network arrangements due to the number of variables that dynamically change and the number of devices with non-homogeneous or unknown specifications. This technical challenge is further exacerbated in cloud computing and/or network computing arrangements, in which multiple devices may be used to serve different functions for the application.

The use of artificial intelligence models to detect and/or make predictions on these dynamically changing variables potentially offers a solution. However, the difficulty in adapting artificial intelligence models for this practical benefit faces several technical challenges, such as the lack of any available training data. Furthermore, what data is available is often incomplete. For example, while data on some standardized hardware and computer components may be available, many network arrangements involve custom or specialized hardware components. Furthermore, each application may use available hardware and computer components (whether standardized or not) in unique and random fashions.

Despite these technical challenges in adapting artificial intelligence models for this practical benefit, systems and methods are disclosed for determining power consumption predictions and/or usage metric requirements at an application-specific level, even within network arrangements that feature devices with non-homogeneous or unknown specifications. The system and methods may then recommend network arrangements for these devices based on the power consumption predictions and/or usage metric requirements. The systems and methods overcome these technical challenges by generating, and training a model on, a device profile repository that includes device profiles that are based on known specifications (e.g., specifications provided by a manufacturer of standardized computer hardware) but also device profiles based on virtual specifications. For example, through the use of device profiles based on virtual specifications, the systems and methods generate a "digital twin" of devices having non-homogeneous or unknown specifications. By using this digital twin, the system may complete incomplete sets of training data and thus properly train the artificial intelligence model.

To generate the digital twin, the systems and methods may generate a network mapping of a computer network. The network mapping may indicate relationships between a plurality of devices in the computer network through the use of a series of interconnected nodes in which the nodes represent specific devices and the edges between nodes indicate the relationships. Furthermore, the network mapping may be populated with respective known specifications, wherein the respective known specifications are based on respective vendor information, respective model information, respective serial number information, or respective geographical location information. The system may then infer respective virtual specifications for any devices with non-homogeneous or unknown specifications based on the relationships between the plurality of devices and the respective known specifications. By doing so, the system may generate the needed virtual specifications that "fill in the gaps" of the network mapping and allow for an artificial intelligence model to be properly trained to provide power consumption predictions at an application-specific level, even within network arrangements that feature devices with non-homogeneous or unknown specifications.

Upon creation of the network mapping, the systems and methods may generate a recommendation for a network arrangement for an application based on the subset of devices that provides the lowest power consumption and/or meets one or more other usage metric requirements.

In some aspects, systems and methods for providing network arrangements for devices with non-homogeneous or unknown specifications based on power consumption for selected applications are described. For example, the system may receive a first user request to generate a first network arrangement of a plurality of devices for a first application across a first network. The system may receive a first usage metric requirement for the first application, wherein the first usage metric requirement describes required metadata related to one or more processes performed by the first application. The system may determine, from the plurality of devices, a plurality of subsets of devices for serving the first application. The system may retrieve, from a device profile repository, respective device profiles corresponding to devices on the first network, wherein the device profile repository comprises a first set of device profiles corresponding to devices with known specifications and a second set of device profiles corresponding to devices with virtual specifications. The system may determine, using a first model, a first output, wherein the first model is trained to generate respective application-specific power consumption predictions for the plurality of subsets of devices based on inputted usage metric requirements and the respective device profiles. The system may select from the plurality of subsets of devices a first subset of devices for serving the first application based on the first output. The system may generate a recommendation for the first network arrangement based on the first subset of devices.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 2A-D show an illustrative diagram related to power consumption predictions, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
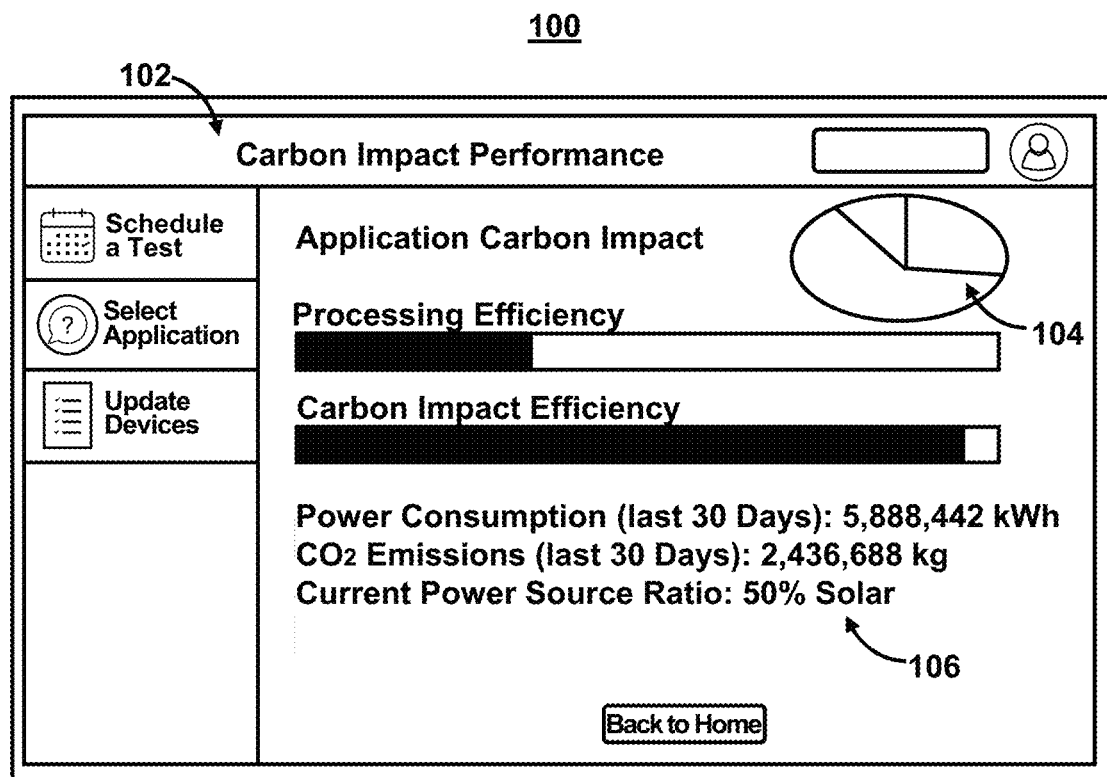
FIG. 1 shows an illustrative diagram for a user interface related to power consumption predictions, in accordance with one or more embodiments.

FIG. 1 shows an illustrative diagram for a user interface related to power consumption predictions, in accordance with one or more embodiments. For example, systems and methods are described herein for providing power consumption predictions for selected applications within network arrangements featuring devices with non-homogeneous or unknown specifications. These predictions may be shown in user interface 100.

As referred to herein, a "user interface" may comprise a human-computer interaction and communication in a device and may include display screens, keyboards, a mouse, and the appearance of a desktop. For example, a user interface may comprise a way a user interacts with an application or a website. User interface 100 may present content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. In some embodiments, the content may relate to carbon impact. For example, content may include metrics 106.

In some embodiments, the system may identify a carbon impact (e.g., a carbon dioxide output, energy consumption, carbon footprint, and/or other emissions standard) of a business application within an enterprise datacenter infrastructure. By doing so, the system may recommend changes to the application's deployment in the future for a lower carbon impact. To do so, the system may collect various data points of the technology infrastructure items that make up the underlying environment for the application to run on. The system may determine metrics such as capacity, utilization, power consumption, location, usage, application assignment within the enterprise, etc. In addition, the system may gather metrics from the datacenter itself, such as power feeds, the type of power production for those feeds, locations, and the generally accepted carbon offset to the power at a specific rate in those locations based on the feed source.

The system may determine power consumption predictions, which may comprise a prediction based on a past, current, and/or future time period. Furthermore, the power consumption prediction may be expressed in terms of a carbon impact. As referred to herein, a "carbon impact" may comprise a quantitative or qualitative measure based on carbon dioxide output, energy consumption, carbon footprint, and/or other emissions standard such as global emissions factors (e.g., emission factors in grams $CO_2e$ per kilowatt-hour). For example, the system may determine a carbon impact based on the total greenhouse gas (GHG) emissions caused by an individual, event, organization, service, place, or product expressed as a carbon dioxide equivalent ($CO_2$). GHGs, including the carbon-containing gases carbon dioxide and methane, can be emitted through the burning of fossil fuels, land clearance, and the production and consumption of food, manufactured goods, materials, wood, roads, buildings, transportation, and other services. The emission of these gases may be used to generate electricity (e.g., electricity used to power electronic devices). The system may translate the amount of electricity used to power a device (or group of devices) servicing an application into a measure of the carbon impact.

In some embodiments, a power consumption prediction may comprise multidimensional data based on one or more factors. For example, while power consumption may, in some embodiments, be based on a single value (e.g., carbon impact), in some embodiments, power consumption may be based on a combination of factors, weights, and/or algorithms. For example, in some embodiments, power consumption may be further based on performance metrics and/or characteristics, which may be collected from devices. For example, using a combination of those factors, the system may determine a power consumption prediction that classifies devices and/or network arrangements in multiple dimensions (e.g., "efficiency 1: resource allocations vs. power consumption" and "efficiency 2: performance vs. power consumption").

For example, a power consumption prediction may be based on one or more performance metrics for a device and/or network. For example, performance metrics and/or characteristics for a device and/or network may comprise measurable attributes or indicators that determine its overall speed, efficiency, and capability to handle various tasks. These characteristics can vary depending on the specific components, configurations, and usage scenarios of the computer and include attributes such as processing power, memory capacity used, storage speed, graphics performance, network performance, input/output (I/O) performance, power efficiency, and/or other metrics (e.g., reliability, security, etc.). The processing power of a computer is typically measured by its CPU (Central Processing Unit) performance. Key factors include clock speed (measured in GHz), number of cores, and the efficiency of the architecture. Higher processing power enables faster execution of tasks and better multitasking capabilities. The amount of RAM (Random Access Memory) in a computer affects its ability to handle multiple applications and data simultaneously. More memory allows for smoother multitasking, faster data access, and better overall system performance. The speed and type of storage devices, such as solid-state drives (SSDs) or hard disk drives (HDDs), impact the computer's data access and transfer rates. Faster storage allows for quicker boot times, faster application loading, and improved file read/write operations. Graphics performance is especially important for tasks involving image rendering, video editing, gaming, or graphical simulations. Graphics processing units (GPUs) with higher processing power and dedicated video memory contribute to smoother graphics rendering and enhanced visual experiences. For network-intensive tasks or applications, network performance plays a crucial role. Network interface cards (NICs) and network adapters with higher bandwidth capabilities, such as Gigabit Ethernet or Wi-Fi standards, ensure faster data transfer rates and improved network responsiveness. I/O performance refers to the speed at which the computer can interact with peripheral devices like keyboards, mice, external storage, or USB devices. Faster I/O performance reduces latency and enhances the overall user experience.

In some embodiments, the system may use a power consumption prediction to determine a network arrangement. A network arrangement may refer to the design or configuration of network components and their interconnections. It defines how devices, systems, and infrastructure are organized to enable communication and data exchange within a computer network. Network arrangements can vary based on the size, purpose, and complexity of the network. In some embodiments, the network arrangement may also refer to the devices used to process an application, where applications (and their components) are stored, the processing routes used, the location of data stored, the technology stacks (and layer therein) used, and/or data placement.

In another example, the network arrangement may relate to how data is processed and stored and/or network procedures. For example, the system may analyze duplicates of data in an environment and produce recommendations for better power consumption. For example, the system may determine that for the same data duplicated on different storage arrays, which cannot be deduplicated using built-in array mechanisms, the ideal network arrangement involves utilization of snapshots/clones instead of keeping many copies of the same data.

In some embodiments, the application-specific power consumption prediction may comprise a prediction related to a past, current, and/or future use of power. Additionally or alternatively, the system may express the prediction in terms of carbon impact. For example, as shown in FIG. 1, user interface 100 may present carbon impact performance summary 102. User interface 100 may present content in numerous forms, such as textual or graphical data (e.g., graph 104). Additionally or alternatively, the system may present quantitative or qualitative metrics related to the content. For example, as shown in user interface 100, the system may present current metrics on power consumption, carbon emissions, and/or power sources.

Each of the metrics may further be specific to a given application. For example, user interface 100 may generate information related to power consumption and/or carbon impact for a selected application. This information may be based on time-series data and presented in real time. As described herein, "time-series data" may include a sequence of data points that occur in successive order over some period of time. In some embodiments, time-series data may be contrasted with cross-sectional data, which captures a point in time. A time series can be taken on any variable that changes over time. The system may use a time series to track the variable (e.g., power consumption and/or carbon impact) over time. This can be tracked over the short term or the long term. The system may generate a time-series analysis. For example, a time-series analysis may be useful to see how a variable changes over time. It can also be used to examine how the changes associated with the chosen data point compare to shifts in other variables over the same time period.

The time-series analysis may determine various trends, such as a secular trend, which describes the movement along the term, a seasonal variation, which represents seasonal changes, cyclical fluctuations, which correspond to periodical but not seasonal variations, and irregular variations, which are other nonrandom sources of variations of series. The system may maintain correlations for this data during modeling. In particular, the system may maintain correlations through non-normalization as normalizing data inherently changes the underlying data, which may render correlations, if any, undetectable and/or lead to the detection of false positive correlations. For example, modeling techniques (and the predictions generated by them), such as rarefying (e.g., resampling as if each sample has the same total counts), total sum scaling (e.g., dividing counts by the sequencing depth), and others, and the performance of some strongly parametric approaches depend heavily on the normalization choices. Thus, normalization may lead to lower model performance and more model errors. The use of a non-parametric bias test alleviates the need for normalization while still allowing the methods and systems to determine a respective proportion of error detections for each of the plurality of time-series data models.

As referred to herein, a "modeling error" or simply an "error" may correspond to an error in the performance of the model. For example, an error in a model may comprise an inaccurate or imprecise output or prediction for the model. This inaccuracy or imprecision may manifest as a false positive or a lack of detection of a certain event. These errors may occur in models corresponding to a particular sub-segment (e.g., a component model as described herein) that results in inaccuracies for predictions and/or output based on the sub-segment, and/or the errors may occur in models corresponding to an aggregation of multiple sub-segments (e.g., a composite model as described herein) that result in inaccuracies for predictions and/or outputs based on errors received in one or more of predictions of the plurality of sub-segments and/or an interpretation of the predictions of the plurality of sub-segments.

Figure 2A:
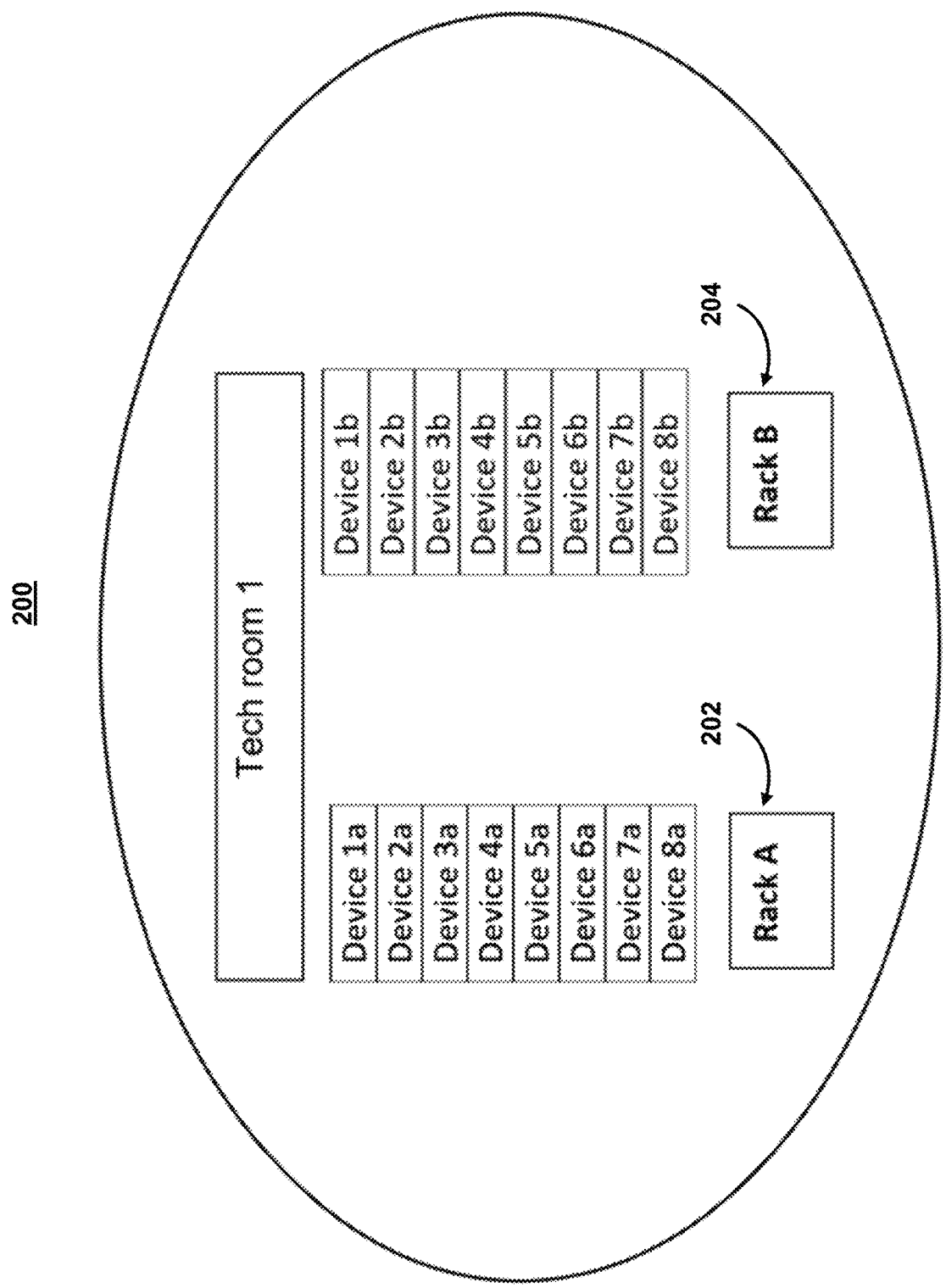

FIGS. 2A-D show an illustrative diagram related to power consumption predictions, in accordance with one or more embodiments. For example, FIG. 2A shows an illustrative diagram of a network (e.g., comprising a set of devices). For example, most computer applications rely on complex processes and technically diverse network arrangements. These network arrangements feature numerous non-homogeneous devices (e.g., devices with different hardware, configurations, software/operating systems, and/or other specifications). One of the features common to any computer equipment is its demand for the electrical energy required for its operation and the associated emission of carbon dioxide emitted into the atmosphere during the production of electricity. Along with the growing environmental awareness and legal regulations, many entities are obligated to reduce carbon dioxide emissions. One of the many areas in which changes are expected is the information technology infrastructure, which is commonly indicated as an area generating high carbon emission values. In order to be able to make decisions in this regard, it is necessary to know the current electricity consumption and the associated carbon emission values for all components of the infrastructure.

However, this presents a severe technical challenge. For example, while it is possible to measure a current power consumption for a specific device (e.g., a single computer), a set of devices (a cabinet with several devices—in a server room "rack"), or entire dedicated areas (technical room, data center), it is difficult or even impossible to do so on the application level, particularly in complex network arrangements due to the number of variables that dynamically change and the number of devices with non-homogeneous or unknown specifications. For example, diagram 200 may include rack 202 and rack 204. For example, diagram 200 may represent a technical room with two cabinets with equipment and eight devices in each of the cabinets.

FIG. 2B shows an illustrative diagram of power consumption levels for the set of devices of FIG. 2A. For example, table 220 comprises examples of current power consumption values (e.g., usage metrics) that the system may obtain. As shown in table 220, although there are some usage metrics provided, the usage metrics are not sufficient to make informed decisions about reducing carbon impact for this environment. Furthermore, there is no conventional system for automatic mapping of business processes to the infrastructure used, no information on the percentage share of hardware usage for business processes—in particular for shared infrastructure (virtualization systems, storage systems, network devices, etc.)—a lack of detailed information on the efficiency of the use of equipment versus energy demand, and no information on the relationship between the energy demand and the amount of carbon emissions associated with the generation of electricity in each location/building.

As such, adapting artificial intelligence models for this practical benefit faces several technical challenges, such as the lack of any available training data. Furthermore, what data is available is often incomplete. For example, while data on some standardized hardware and computer components may be available, many network arrangements involve custom or specialized hardware components. Furthermore, each application may use available hardware and computer components (whether standardized or not) in unique and random fashions.

Despite these technical challenges in adapting artificial intelligence models for this practical benefit, systems and methods are disclosed for providing power consumption predictions at an application-specific level, even within network arrangements that feature devices with non-homogeneous or unknown specifications. The systems and methods overcome these technical challenges by generating, and training a model on, a device profile repository that includes device profiles that are based on known specifications (e.g., specifications provided by a manufacturer of standardized computer hardware) but also device profiles based on virtual specifications. For example, through the use of device profiles based on virtual specifications, the systems and methods generate a digital twin of devices having non-homogeneous or unknown specifications. By using this digital twin, the system may complete incomplete sets of training data and thus properly train the artificial intelligence model.

For example, the system may collect various data points of the technology infrastructure items that make up the underlying environment for the application to run on. For example, the system may collect usage metrics, which may comprise metrics that describe the features, functions, capabilities, and/or other attributes of a specific device. The usage metrics may include capacity, utilization, power consumption, location, usage, application assignment within the enterprise, etc. In addition, the system may gather metrics for a network (or portion of a network) itself, such as power feeds, the type of power production for those feeds, locations, and/or the carbon offset to the power at a specific rate in those locations based on the feed source.

The system may use automated or manual data collectors to determine the current consumption data of devices, the type of devices, and/or other information about a network. As referred to herein, a "device profile" may comprise the set of attributes (services, capabilities, and/or features) associated with a particular device. The system may then generate a "known" device profile based on these "known" specifications. For example, the system map probes devices for information related to respective vendor information, respective model information, respective serial number information, or respective geographical location information. For example, a specification may comprise information and/or metadata related to hardware, software, protocols, and/or the connection medium of a device as well as the performance thereof.

In some embodiments, the system may detect gaps in the network mapping that correspond to nodes in the mapping (e.g., devices in the network) for which the specifications are not standardized and/or are otherwise unknown. In such cases, the system may generate a "virtual device profile," and the virtual device profile may comprise "virtual specifications." As referred to herein, a "virtual specification" refers to an operating performance specification for a network device that is not defined by an equipment vendor. For example, a virtual specification may be inferred based on monitoring and/or probing one or more devices connected to (and/or integrating with) another device. In some examples, the virtual specification may be based on similar devices and/or similar known specifications (e.g., as provided by a vendor of the device). In some embodiments, the virtual device profile may comprise a virtual representation of a given device and estimates of energy demand in accordance with a specific configuration and technical documentation.

In some embodiments, a device profile may be further defined into "device sub-profiles." Device sub-profiles may comprise a portion, segment, and/or other designation of one or more processes, components, and/or functions of a device. For example, in some embodiments, the system may perform calculations on "device profiles," which are calculated based on the resources allocated/consumed by a specific application. In such cases, the system may refer to a device sub-profile of a device profile that corresponds to a designated application.

FIG. 2C shows an illustrative diagram of a network mapping for the set of devices of FIG. 2A. For example, as shown in table 240, the system may generate several types of information. As shown, each device is assigned to a specific application. This may be predetermined and/or determined dynamically based on use. The system may record and/or store this information in a central register of applications and/or a central register of devices, which may comprise a device profile repository.

As referred to herein, the device profile repository comprises a datastore or other memory comprising a plurality of device profiles. The device profiles may comprise both known device profiles as well as virtual device profiles. As a result, a list of devices with an assigned number and name of the device is produced. In the case of shared infrastructure, the percentage of resource utilization for each application may be calculated separately. In some embodiments, the exact specificity of the calculation depends on the type/purpose of the equipment. The system may also determine specific information based on a type of device (e.g., metrics for storage devices may comprise storage capacity utilized, metrics for network devices may comprise the number of ports used on switches in the physical and virtual layers (e.g., as a percentage of traffic in connections between switches)), and for virtualization tier servers, the metrics may comprise the number of virtual resources allocated, etc.

As shown in table 240, for the components, both from the perspective of the hardware itself and also from the perspective of the application, the system may calculate the efficiency of use. In some embodiments, the exact specificity of the calculation depends on the type/purpose of the equipment. The system may also determine specific information based on a type of device (e.g., for storage devices, the system may calculate logical amount of stored data versus power consumption (and logical amount of stored data versus carbon emissions); for network devices, the system may calculate the number of network ports used versus power consumption (and the number of network ports used versus carbon emissions); and for virtualization tier servers, the system may calculate the size of allocated virtual resources versus power consumption (and the size of allocated virtual resources versus carbon emissions)).

FIG. 2D shows an illustrative diagram of predicted efficiencies for the set of devices of FIG. 2A. For example, as shown in FIG. 2D, the system may calculate a power consumption and efficiency for each device (table 260) and/or application (table 280). The system may then, based on information on a power source of energy supply for each of the devices and/or information on the cost of electricity production expressed in carbon emissions, generate data for each device and/or each application.

For example, based on received metrics, the system calculates the carbon impact, based on power consumption, for the infrastructure components that the application utilizes. This is then combined with similar information within a dashboard (e.g., user interface 100 (FIG. 1)) for a visual representation and comparison of carbon impacts based on business, application-specific, technology-specific, location-specific, and other scenarios. The data, the impact scoring, and the viewpoints are all made available by the system to users for discussion, investigation, and/or decisioning on what changes should occur to adjust the carbon impact in a positive direction.

Figure 3:
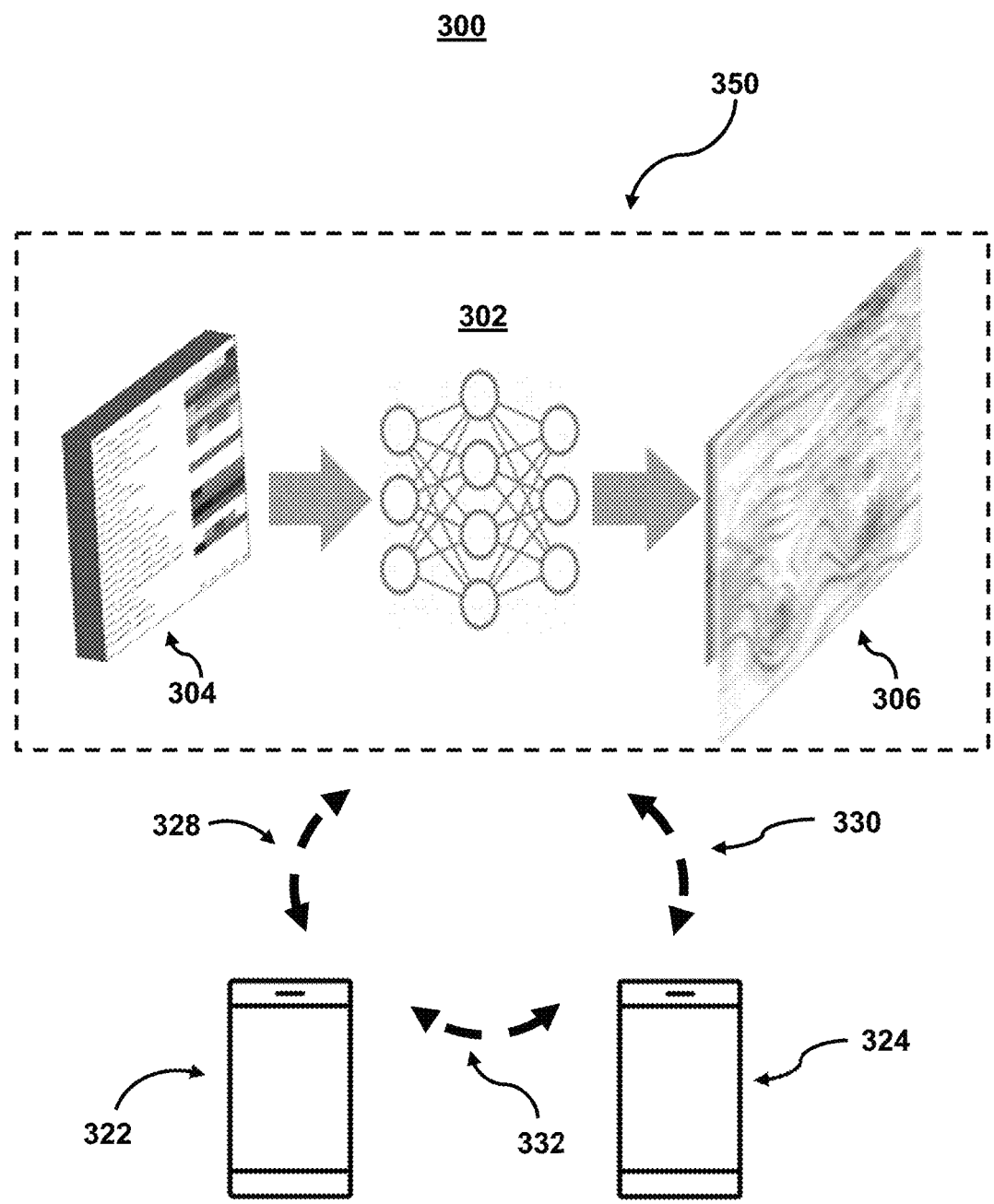
FIG. 3 shows illustrative components for a system used to generate power consumption predictions, in accordance with one or more embodiments.

For example, as further described in FIG. 3, the system may use a model and/or algorithm that collects a list of devices (including vendor, model, type, serial number, name, geographical location), pulls device power consumption (or builds a digital twin if needed), pulls device utilization (e.g., total capacity, used capacity), calculates device efficiency (e.g., by comparing two figures: power consumption/total capacity versus power consumption/used capacity), collects a list of applications and/or their processes running on the device (e.g., based on an application identifier and server (client) name), calculates percentage of resources consumed by application/process on the device, and uses global emissions factors per location to calculate carbon emission values for the devices and applications.

FIG. 3 shows illustrative components for a system used to generate power consumption predictions, in accordance with one or more embodiments. As shown in FIG. 3, system 300 may include mobile device 322 and mobile device 324. While shown as smartphones in FIG. 3, it should be noted that mobile device 322 and mobile device 324 may be any computing device, including, but not limited to, a laptop computer, a tablet computer, a handheld computer, and other computer equipment (e.g., a server), including "smart," wireless, wearable, and/or mobile devices. System 300 may also include cloud components. For example, cloud components may be implemented as a cloud computing system and may feature one or more component devices. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by cloud components. In some embodiments, the various computers and systems described herein may include one or more computing devices that are programmed to perform the described functions. Additionally or alternatively, multiple users may interact with system 300 and/or one or more components of system 300.

With respect to the components of mobile device 322 and mobile device 324, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and mobile device 324 include a display upon which to display data.

Additionally, as mobile device 322 and mobile device 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, a magnetic hard drive, a floppy drive, etc.), electrical-charge-based storage media (e.g., EEPROM, RAM, etc.), solid-state storage media (e.g., a flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

System 300 also includes API layer 350. API layer 350 may allow the system to generate summaries across different devices. In some embodiments, API layer 350 may be implemented on mobile device 322 or mobile device 324. Alternatively or additionally, API layer 350 may reside on one or more of cloud components. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in transactions.

API layer 350 may use various architectural arrangements. For example, system 300 may be partially based on API layer 350 such that there is a strong adoption of SOAP and RESTful Web services using resources like Service Repository and Developer Portal but with low governance, standardization, and separation of concerns. Alternatively, system 300 may be fully based on API layer 350 such that separation of concerns between layers like API layer 350, services, and applications is in place.

In some embodiments, the system architecture may use a microservice approach. Such systems may use two types of layers: a Front-End Layer and Back-End Layer, where microservices reside. In this kind of architecture, the role of the API layer 350 may provide integration between the Front End and Back End. In such cases, API layer 350 may use RESTful APIs (exposition to the Front End or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as a standard for external integration.

System 300 also includes model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., an energy consumption prediction, a carbon impact, a virtual specification, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, the model (e.g., model 302) may automatically perform actions based on outputs 306. In some embodiments, the model (e.g., model 302) may not perform any actions. The output of the model (e.g., model 302) may be used to determine an energy consumption prediction, a carbon impact, a virtual specification, etc.

As shown in FIG. 3, in some embodiments, model 302 may be trained by taking inputs 304 and provide outputs 306. Model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302, where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., an energy consumption prediction, a carbon impact, a virtual specification, etc.).

Model 302 is shown as a convolutional neural network. A convolutional neural network consists of an input layer (e.g., input 304), hidden layers, and an output layer (e.g., output 306). As shown in FIG. 3, the middle layers are called hidden because their inputs and outputs are masked by the activation function and final convolution. In a convolutional neural network, the hidden layers include layers that perform convolutions. Model 302 may comprise convolutional layers that convolve the input and pass its result to the next layer. Model 302 includes local and/or global pooling layers along with traditional convolutional layers. Pooling layers reduce the dimensions of data by combining the outputs of neuron clusters at one layer into a single neuron in the next layer. Also, as shown, model 302 may comprise fully connected layers that connect every neuron in one layer to every neuron in another layer.

Figure 4:
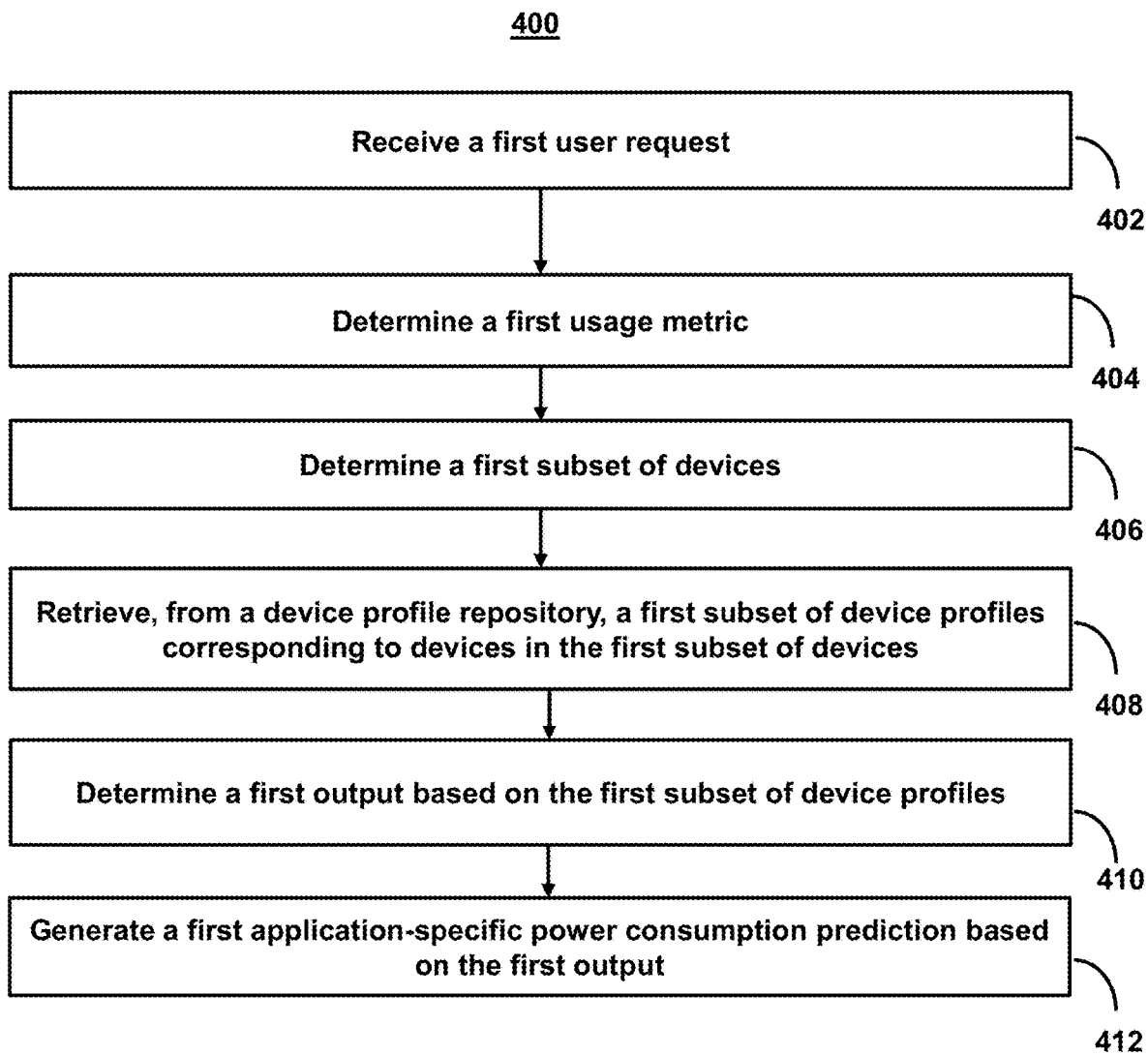
FIG. 4 shows a flowchart of the steps involved in generating power consumption predictions, in accordance with one or more embodiments.

FIG. 4 shows a flowchart of the steps involved in generating power consumption predictions, in accordance with one or more embodiments. For example, the system may use process 400 (e.g., as implemented on one or more system components described above) in order to provide power consumption predictions for selected applications within network arrangements featuring devices with non-homogeneous or unknown specifications. For example, the system may use a model and/or algorithm that collects a list of devices (including vendor, model, type, serial number, name, geographical location), pulls device power consumption (or builds a digital twin if needed), pulls device utilization (total capacity, used capacity), calculates device efficiency (e.g., by comparing two figures: power consumption/total capacity versus power consumption/used capacity), collects a list of applications and/or their processes running on the device (e.g., based on an application identifier and server (client) name), calculates percentage of resources consumed by application/process on the device, and uses global emissions factors per location to calculate carbon emission values for the devices and applications.

At step 402, process 400 (e.g., using one or more components described above) receives a first user request. For example, the system may receive a first user request to generate a first application-specific power consumption prediction for a first application. For example, the system may receive a request from a user to see current or prediction energy consumption and/or carbon related emissions stemming from the use of one or more applications in one or more device arrangements within a network.

At step 404, process 400 (e.g., using one or more components described above) determines a first usage metric. For example, the system may determine a first usage metric for the first application, wherein the first usage metric describes metadata related to one or more processes performed by the first application across a first network, wherein the first network comprises a plurality of devices. The system may determine one or more usage metrics for the first application. These usage metrics may comprise present power consumption as expressed in watt-hours, total capacity expressed in terabytes for storage arrays and number of ports for switches, used capacity expressed in terabytes for storage arrays and number of ports for switches, a list of logical data volumes created on data arrays for client's consumption, logical data volumes utilization expressed in gigabytes, a list of (or number of) servers (clients) connected to the logical data volumes, and/or other global emissions factors.

In some embodiments, the system may determine one or more usage metrics. For example, the usage metric may describe the present power consumption (e.g., expressed in watt-hours), a total capacity (e.g., expressed in terabytes) for storage arrays and a number of ports for switches, used capacity (e.g., expressed in terabytes) for storage arrays and a number of ports for switches, a list of logical data volumes created on data arrays for an application's consumption, a logical data volumes utilization (e.g., expressed in gigabytes), list of servers (clients) connected to logical data volumes, etc. For example, the system may determine a first process performed by the first application. The system may determine a data volume created on a data array for consumption by the first application during the first process. In another example, the system may determine a first process performed by the first application. The system may determine watt-hour power consumption by the first application during the first process. In another example, the system may determine a first process performed by the first application. The system may determine a number of ports for switches dedicated to the first application during the first process. In another example, the system may determine a first process performed by the first application. The system may determine a number of data arrays created for the first application during the first process.

At step 406, process 400 (e.g., using one or more components described above) determines a first subset of devices. For example, the system may determine, from the plurality of devices, a first subset of devices for serving the first application based on the first usage metric. For example, the system may determine what devices of a plurality of available devices are used to serve the first application.

In some embodiments, the system may determine a subset of devices that are serving a given application. To do so, the system may retrieve application and/or device identifiers for devices active during a process of the application. For example, the system may determine a number of devices of the plurality of devices required by the first application based on the first usage metric. The system may determine the first subset of devices based on the number of devices. In another example, the system may determine a first process performed by the first application based on the first usage metric. The system may filter the plurality of devices based on whether a respective device is utilized during the first process.

At step 408, process 400 (e.g., using one or more components described above) retrieves, from a device profile repository, a first subset of device profiles corresponding to devices in the first subset of devices. For example, the system may retrieve, from a device profile repository, a first subset of device profiles corresponding to devices in the first subset of devices, wherein the device profile repository comprises a first set of device profiles corresponding to devices with known specifications and a second set of device profiles corresponding to devices with virtual specifications. The system may generate a device profile that comprises both known device profiles as well as virtual device profiles.

The system may, in some embodiments, use an artificial intelligence model. For example, the system may generate a first feature input, wherein the first feature input is based on the first application and the first subset of devices. The system may then input the first feature input into the first model, wherein the first model comprises an artificial intelligence model.

The system may use one or more methodologies for generating the device profile repository. In particular, the system may use one or more methodologies for generating virtual device profiles and/or determining virtual specifications for a device. In some embodiments, the system may determine an aggregate power consumption (e.g., aggregate carbon impact) for one or more devices. For example, the system may retrieve known specifications for one or more devices that are connected to (or accessed with) a device with an unknown specification. The system may then determine a component power consumption (e.g., component carbon impact) for the one or more devices and then determine a difference between the component power consumption (e.g., component carbon impact) and the aggregate power consumption (e.g., aggregate carbon impact). The system may then use the difference to estimate the virtual specification.

For example, the system may retrieve an aggregate carbon impact for a first device and a second device. The system may retrieve a first device profile for the first device, wherein the first device profile is based on a first known specification. The system may determine a first component carbon impact for the first device based on the first known specification. The system may determine a difference between the first component carbon impact and the aggregate carbon impact. The system may determine a second component carbon impact for the second device based on the difference. The system may determine a second virtual specification for the second device based on the second component carbon impact.

In some embodiments, the system may determine an aggregate processing metric for one or more devices. A processing metric may comprise a qualitative or quantitative metric resulting from a process performed by an application. For example, the processing metric may comprise a metric related to the performance of one or more application functions (e.g., how quickly data is processed, how quickly data is stored, etc.). For example, the system may retrieve known specifications for one or more devices that are connected to (or accessed with) a device with an unknown specification. The system may then determine a component processing metric for the one or more devices and then determine a difference between the component processing metric and the aggregate processing metric. The system may then use the difference to estimate the virtual specification.

For example, the system may retrieve an aggregate processing metric for a first device and a second device. The system may retrieve a first device profile for the first device, wherein the first device profile is based on a first known specification. The system may determine a first component processing metric for the first device based on the first known specification. The system may determine a difference between the first component processing metric and the aggregate processing metric. The system may determine a second processing metric for the second device based on the difference. The system may determine a second virtual specification for the second device based on the second processing metric.

In some embodiments, the system may determine a network mapping for a network, and the system may generate the virtual device profiles based on the network mapping. For example, the system may determine relationships between devices in the mapping. The relationships may comprise information about how devices are connected, how devices are used, and/or what devices are grouped when performing one or more processes for one or more applications. Within the network mapping, each device (or group of devices) may be represented by a node. The system may then determine known node characteristics (e.g., a processing metric, carbon impact, energy consumption metric, etc.) and use the known node characteristics to determine the virtual node characteristics. For example, the node characteristics may comprise a metric related to the performance of one or more application functions (e.g., how quickly data is processed, how quickly data is stored, etc.). For example, the system may retrieve known node characteristics for one or more devices that are connected to (or accessed with) a device with an unknown specification. The system may then determine a component node characteristic for the one or more devices and then determine a difference between the component node characteristics and the aggregate node characteristics. The system may then use the difference to estimate the virtual specification.

For example, the system may retrieve a network mapping for the first network, wherein the network mapping indicates relationships between the plurality of devices and wherein each of the plurality of devices is represented by respective nodes in the network mapping. The system may identify a first node subset of the respective nodes, wherein the first node subset comprises nodes with respective known specifications. The system may generate a known network mapping based on populating the network mapping at each node of the first node subset with the respective known specifications. The system may identify a second node subset of the respective nodes, wherein the second node subset comprises nodes with respective unknown specifications and wherein the second node subset comprises unpopulated nodes in the known network mapping. The system may infer respective virtual specifications for each node in the second node subset based on the relationships between the plurality of devices and the respective known specifications in the known network mapping.

At step 410, process 400 (e.g., using one or more components described above) determines a first output based on the first subset of device profiles. For example, the system may determine, using a first model, a first output, wherein the first model is trained to generate application-specific power consumption predictions for respective applications based on inputted usage metrics for the respective applications and respective device profiles, from the device profile repository, for devices serving the respective applications. The system may use a model to determine application-specific power consumption prediction using one or more models. In some embodiments, the system may use artificial intelligence models (e.g., as described in FIG. 3 above). In some embodiments, the system may use other model techniques.

In some embodiments, the system may generate an output that is used by the system to determine an application-specific power consumption prediction. In some embodiments, the output may comprise the power consumption prediction. Additionally or alternatively, the system may reformat the output into the power consumption prediction and/or base the power consumption prediction on the output. For example, the system may determine a carbon impact for serving the first application with the first subset. The system may determine the first application-specific power consumption prediction based on the carbon impact.

165421660.1 Page 23

At step 412, process 400 (e.g., using one or more components described above) generates a first application-specific power consumption prediction based on the first output. For example, the system may generate for display, on a user interface, the first application-specific power consumption prediction based on the first output. In some embodiments, the application-specific power consumption prediction may comprise a prediction related to a past, current, and/or future use of power. Additionally or alternatively, the system may express the prediction in terms of carbon impact.

In some embodiments, the application-specific power consumption prediction and/or its carbon impact may be based on a type of power source powering the devices. For example, the system may account for the carbon impact of different manners in which electricity for a given device is generated. For example, the system may determine a different carbon impact for devices powered by solar or wind power from that of coal or nuclear power. That is, the system may determine an average or aggregate carbon impact ratio for the power source (e.g., based on third-party information) and adjust the carbon impact accordingly. For example, the system may determine a power source for powering the first subset. The system may determine the carbon impact ratio for the power source. The system may adjust the carbon impact based on the carbon impact ratio.

In some embodiments, the system may determine the type of power source based on a geographic location (or network location) of a power source. For example, the system may determine that a server farm is in a geographic location that is served by a particular power source (or a series of different power sources, which may be defined by a percentage). For example, the system may determine a geographic location for the first subset. The system may determine the power source based on the geographic location. In another example, the system may determine a network location for the first subset. The system may determine the power source based on the network location.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
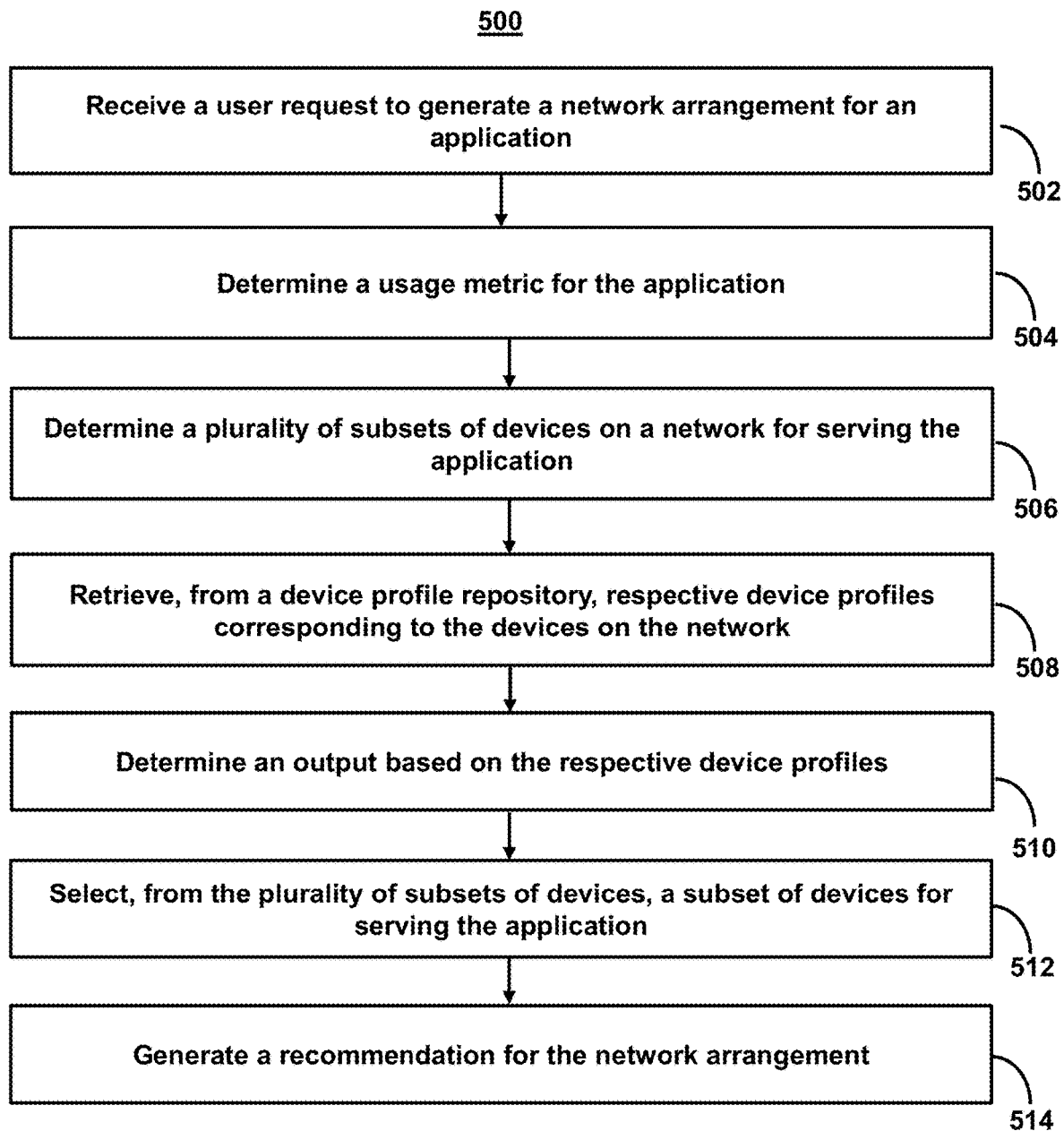
FIG. 5 shows a flowchart of the steps involved in generating recommendations for network arrangements, in accordance with one or more embodiments.

FIG. 5 shows a flowchart of the steps involved in generating recommendations for network arrangements, in accordance with one or more embodiments. For example, the system may use process 500 (e.g., as implemented on one or more system components described above) in order to provide power consumption predictions for selected applications within network arrangements featuring devices with non-homogeneous or unknown specifications. For example, the system may use a model and/or algorithm that collects a list of devices (including vendor, model, type, serial number, name, geographical location), pulls device power consumption (or builds a digital twin if needed), pulls device utilization (total capacity, used capacity), calculates device efficiency (e.g., by comparing two figures: power consumption/total capacity versus power consumption/used capacity), collects a list of applications and/or their processes running on the device (e.g., based on an application identifier and server (client) name), calculates percentage of resources consumed by application/process on the device, and uses global emissions factors per location to calculate carbon emission values for the devices and applications. The system may then use this information to suggest network arrangements for specific applications that optimize one or more usage metrics.

At step 502, process 500 (e.g., using one or more components described above) receives a user request to generate a network arrangement for an application. For example, the system may receive a first user request to generate a first network arrangement of a plurality of devices for a first application across a first network. For example, the system may receive a request from a user to receive a recommendation of one or more devices (and/or network arrangements) to use to power a specified application based on current and/or prediction energy consumption and/or carbon related emissions stemming from the use of the application in one or more device arrangements within the network.

At step 504, process 500 (e.g., using one or more components described above) determines a usage metric for the application. For example, the system may determine a first usage metric for the first application, wherein the first usage metric requirement describes required metadata related to one or more processes performed by the first application. The system may determine one or more usage metrics for the first application. These usage metrics may comprise present power consumption as expressed in watt-hours, total capacity expressed in terabytes for storage arrays and number of ports for switches, used capacity expressed in terabytes for storage arrays and number of ports for switches, a list of logical data volumes created on data arrays for client's consumption, logical data volumes utilization expressed in gigabytes, a list of (or number of) servers (clients) connected to the logical data volumes, and/or other global emissions factors.

In some embodiments, the system may determine one or more usage metrics that describe different components and/or processes used to facilitate an application. For example, the usage metric may describe the present power consumption (e.g., expressed in watt-hours), a total capacity (e.g., expressed in terabytes) for storage arrays and a number of ports for switches, used capacity (e.g., expressed in terabytes) for storage arrays and a number of ports for switches, a list of logical data volumes created on data arrays for an application's consumption, a logical data volumes utilization (e.g., expressed in gigabytes), list of servers (clients) connected to logical data volumes, etc. For example, the system may determine a first process performed by the first application. The system may determine a data volume created on a data array for consumption by the first application during the first process. In another example, the system may determine a first process performed by the first application. The system may determine watt-hour power consumption by the first application during the first process. In another example, the system may determine a first process performed by the first application. The system may determine a number of ports for switches dedicated to the first application during the first process. In another example, the system may determine a first process performed by the first application. The system may determine a number of data arrays created for the first application during the first process.

At step 506, process 500 (e.g., using one or more components described above) determines a plurality of subsets of devices on a network for serving the application. For example, the system may determine, from the plurality of devices, a plurality of subsets of devices for serving the first application. For example, the system may determine what devices (and/or arrangements thereof) of a plurality of available devices are used to serve the first application.

In some embodiments, the system may determine a subset of device types that serve or are required to serve a given application. To do so, the system may retrieve application and/or device type identifiers for devices active during a process of the application. For example, the system may determine device types of a plurality of device types required by the first application based on the first usage metric. The system may determine the first subset of devices based on the device types. In another example, the system may determine a first process performed by the first application based on the first usage metric. The system may filter the plurality of devices based on whether a respective device type is utilized during the first process.

In some embodiments, the system may determine a subset of devices that are serving or are required to serve a given application. To do so, the system may retrieve application and/or device identifiers for devices active during a process of the application. For example, the system may determine a number of devices of the plurality of devices required by the first application based on the first usage metric. The system may determine the first subset of devices based on the number of devices. In another example, the system may determine a first process performed by the first application based on the first usage metric. The system may filter the plurality of devices based on whether a respective device is utilized during the first process.

In some embodiments, the system may utilize a device taxonomy to determine what devices and/or device types are required by an application and/or usage metric. A device taxonomy in a computer network may refer to the classification or categorization of different devices based on their functions, roles, and/or characteristics within the network. For example, the system may retrieve a first device taxonomy for the first network, wherein the first device taxonomy indicates required device types corresponding to different usage metrics. The system may then determine, based on the first device taxonomy, that the device type corresponds to the first usage metric.

In some embodiments, the system may utilize multiple device taxonomies. In such cases, the system may select a taxonomy to use based on one or more taxonomy identifiers. The taxonomy identifiers may be specific to an application, usage metric, network, etc. Additionally or alternatively, the system may receive a user input indicating a taxonomy identifier.

For example, a first device taxonomy may be structure based on roles of devices. In such cases, the system may determine what roles are required to process a given application and select the device types accordingly. Such a device taxonomy may comprise end devices (e.g., computers (desktops, laptops, workstations), servers (file servers, application servers, web servers), mobile devices (smartphones, tablets), printers, IP phones, etc.), network infrastructure devices (e.g., routers, switches (Ethernet switches, Layer 3 switches), firewalls, load balancers, wireless access points, network bridges, etc.), network security devices (e.g., Intrusion Detection Systems (IDS), Intrusion Prevention Systems (IPS), Virtual Private Network (VPN) concentrators, proxy servers, network security appliances (Unified Threat Management), etc.), network services devices (e.g., Domain Name System (DNS) servers, Dynamic Host Configuration Protocol (DHCP) servers, Network Time Protocol (NTP) servers, Network monitoring devices (SNMP), Network attached storage (NAS) devices, etc.), Network Management Devices (e.g., Network management systems (NMS), configuration management servers, log servers, syslog servers, traffic analyzers, etc.), and/or miscellaneous devices (e.g., media converters, power over Ethernet (POE) injectors, network-attached cameras (IP cameras), voice over IP (VOIP) gateways, etc.).

In another example, a first device taxonomy may be structured based on power consumption of devices. In such cases, the system may determine what devices are likely to contribute most to power consumption (or another usage metric) when processing a given application. The system may then determine a recommendation based on these devices while minimizing or ignoring devices that are unlikely to contribute to (or have a negligible effect on) power consumption (or another usage metric) when processing the given application. A taxonomy of power usage in a computer network may refer to the categorization or classification of power consumption patterns or devices within a network. Such a device taxonomy may comprise network infrastructure devices such as core switches (e.g., high-capacity switches that handle the backbone of the network infrastructure typically consume a significant amount of power), distribution switches (e.g., switches that connect end devices to the network and generally have moderate power requirements), and routers (e.g., devices that facilitate communication between networks and can vary in power consumption based on their capacity and features). Such a device taxonomy may also comprise end devices such as desktop computers (e.g., traditional desktop computers typically consume more power compared to other end devices due to their higher processing capabilities), laptops (e.g., laptops are generally designed for better power efficiency, as they are built for portability and battery operation), and servers (e.g., servers, depending on their configuration and workload, can range from moderate to high power consumption). Such a device taxonomy may also comprise network peripherals such as printers (e.g., printers can have varying power requirements depending on their type, such as laser printers consuming more power compared to inkjet printers), Wireless Access Points (e.g., access points that provide wireless connectivity generally have moderate power consumption), Uninterruptible Power Supply (UPS) (e.g., UPS systems are used to provide backup power during outages and can range in capacity and efficiency, affecting power usage), and Power Distribution Units (PDUs) (e.g., PDUs distribute power to multiple devices and can often include features such as power monitoring, metering, and remote power control).

In another example, a first device taxonomy may be structured based on energy efficiency measures (e.g., power-saving features and/or energy-efficient hardware) available for different devices. For example, various devices, including network cards, switches, and servers, may have power-saving features that reduce energy consumption during idle periods. Additionally, some devices are designed to be more energy-efficient, incorporating technologies such as Energy Star compliance or low-power components.

At step 508, process 500 (e.g., using one or more components described above) retrieves, from a device profile repository, respective device profiles corresponding to the devices on the network. For example, the system may retrieve, from a device profile repository, respective device profiles corresponding to devices on the first network, wherein the device profile repository comprises a first set of device profiles corresponding to devices with known specifications and a second set of device profiles corresponding to devices with virtual specifications. The system may generate a device profile that comprises both known device profiles as well as virtual device profiles.

The system may, in some embodiments, use an artificial intelligence model. For example, the system may generate a first feature input, wherein the first feature input is based on the first application and the first subset of devices. The system may then input the first feature input into the first model, wherein the first model comprises an artificial intelligence model.

The system may use one or more methodologies for generating the device profile repository. In particular, the system may use one or more methodologies for generating virtual device profiles and/or determining virtual specifications for a device. In some embodiments, the system may determine an aggregate power consumption (e.g., aggregate carbon impact) for one or more devices. For example, the system may retrieve known specifications for one or more devices that are connected to (or accessed with) a device with an unknown specification. The system may then determine a component power consumption for the one or more devices and then determine a difference between the component power consumption and the aggregate power consumption. The system may then use the difference to estimate the virtual specification. The system may then determine a recommendation for a network arrangement based on the first component carbon impact.

For example, the system may retrieve an aggregate power consumption for a first device and a second device. The system may retrieve a first device profile for the first device, wherein the first device profile is based on a first known specification. The system may determine a first component power consumption for the first device based on the first known specification. The system may determine a difference between the first component power consumption and the aggregate power consumption. The system may determine a second component power consumption for the second device based on the difference. The system may determine a second virtual specification for the second device based on the second component power consumption. Using this information, the system may prefer the first device over the second device in a recommended network arrangement.

In some embodiments, the system may determine an aggregate processing metric for one or more devices. A processing metric may comprise a qualitative or quantitative metric resulting from a process performed by an application. For example, the processing metric may comprise a metric related to the performance of one or more application functions (e.g., how quickly data is processed, how quickly data is stored, etc.). For example, the system may retrieve known specifications for one or more devices that are connected to (or accessed with) a device with an unknown specification. The system may then determine a component processing metric for the one or more devices and then determine a difference between the component processing metric and the aggregate processing metric. The system may then use the difference to estimate the virtual specification.

In some embodiments, the aggregate processing metric may be specific to a network arrangement. For example, the system may prefer one network arrangement over another based on the aggregate processing metric for one or more devices in a given network arrangement.

For example, the system may retrieve an aggregate processing metric for a first device and a second device. The system may retrieve a first device profile for the first device, wherein the first device profile is based on a first known specification. The system may determine a first component processing metric for the first device based on the first known specification. The system may determine a difference between the first component processing metric and the aggregate processing metric. The system may determine a second processing metric for the second device based on the difference. The system may determine a second virtual specification for the second device based on the second processing metric.

In some embodiments, the system may determine a network mapping for a network, and the system may generate the virtual device profiles based on the network mapping. For example, the system may determine relationships between devices in the mapping. The relationships may comprise information about how devices are connected, how devices are used, and/or what devices are grouped when performing one or more processes for one or more applications. Within the network mapping, each device (or group of devices) may be represented by a node. The system may then determine known node characteristics (e.g., a processing metric, carbon impact, energy consumption metric, etc.) and use the known node characteristics to determine the virtual node characteristics. For example, the node characteristics may comprise a metric related to the performance of one or more application functions (e.g., how quickly data is processed, how quickly data is stored, etc.). For example, the system may retrieve known node characteristics for one or more devices that are connected to (or accessed with) a device with an unknown specification. The system may then determine a component node characteristic for the one or more devices and then determine a difference between the component node characteristics and the aggregate node characteristics. The system may then use the difference to estimate the virtual specification.

For example, the system may retrieve a network mapping for the first network, wherein the network mapping indicates relationships between the plurality of devices and wherein each of the plurality of devices is represented by respective nodes in the network mapping. The system may identify a first node subset of the respective nodes, wherein the first node subset comprises nodes with respective known specifications. The system may generate a known network mapping based on populating the network mapping at each node of the first node subset with the respective known specifications. The system may identify a second node subset of the respective nodes, wherein the second node subset comprises nodes with respective unknown specifications and wherein the second node subset comprises unpopulated nodes in the known network mapping. The system may infer respective virtual specifications for each node in the second node subset based on the relationships between the plurality of devices and the respective known specifications in the known network mapping.

Using the network mapping, the system may determine a recommendation for a network arrangement. For example, the system may determine a network topology, such as a star, bus, ring, or mesh, influences the arrangement of devices and the flow of data within the network. The choice of network topology depends on factors like scalability, fault tolerance, cost, and/or other usage metric.

At step 510, process 500 (e.g., using one or more components described above) determines an output based on the respective device profiles. For example, the system may determine, using a first model, a first output, wherein the first model is trained to generate application-specific power consumption predictions for respective applications based on inputted usage metrics for the respective applications and respective device profiles, from the device profile repository, for devices serving the respective applications. The system may use a model to determine application-specific power consumption prediction using one or more models. In some embodiments, the system may use artificial intelligence models (e.g., as described in FIG. 3 above). In some embodiments, the system may use other model techniques.

In some embodiments, the system may use multiple models. For example, the system may use a first model to generate application-specific power consumption predictions for respective applications. The system may then use a second model to generate recommendations for network arrangements. A model that is used to generate recommendations for network arrangements may use various inputs, including, but not limited to, application-specific power consumption predictions for respective applications, to generate recommendations for network arrangements. For example, while the model may prefer arrangements that optimize one or more usage metrics, the model may consider other factors.

For example, the system may determine bandwidth and/or latency requirements in a current system. For example, the specific computing tasks may have different requirements in terms of bandwidth (data transfer capacity) and latency (network delay). High-bandwidth tasks or tasks sensitive to latency may require specific network arrangements, such as using high-speed connections or minimizing the number of network hops. Additionally or alternatively, in situations where a computing task involves distributing workload across multiple servers or resources, load balancing techniques may be employed. Load balancers help determine the most efficient distribution of tasks to optimize resource utilization and prevent bottlenecks. In another example, the system may consider redundancy and fault tolerance. For example, critical computing tasks often require redundant network arrangements to ensure high availability and fault tolerance. Redundancy can involve duplicate network paths, failover mechanisms, or backup systems to mitigate the impact of network failures. Additionally or alternatively, the model may consider Quality of Service (QOS) requirements. For example, some computing tasks, such as real-time video streaming or voice communication, have strict QoS requirements. QoS mechanisms prioritize and allocate network resources accordingly to ensure smooth and uninterrupted delivery of such tasks. Additionally or alternatively, the system may consider security. For example, security considerations, such as data confidentiality, integrity, and authentication, can influence the selection of network arrangements. Secure network protocols, encryption, and VPNs may be employed to protect sensitive computing tasks.

In some embodiments, the system may generate an output that is used by the system to determine a recommendation. In some embodiments, the output may comprise the power consumption prediction and/or a recommendation for a network arrangement. Additionally or alternatively, the system may reformat the output into the network arrangement. For example, the system may determine a power consumption for serving the first application with a first subset of devices. The system may determine the recommendation based on the power consumption.

At step 512, process 500 (e.g., using one or more components described above) selects, from the plurality of subsets of devices, a subset of devices for serving the application. For example, the system may select, from the plurality of subsets of devices, a first subset of devices for serving the first application based on the first output.

In some embodiments, the system may determine respective application-specific power consumption predictions for the plurality of subsets of devices. The system may then rank and/or filter different subsets. For example, the system may select the subset with the lowest (or optimized) application-specific power consumption predictions.

In some embodiments, the system may use a model to select the subset. For example, the model may comprise an artificial intelligence model (as described herein) and/or may consider additional factors such as bandwidth and latency requirements, load balancing, redundancy and fault tolerance, QoS, and/or network security as described above. Additionally, the system may receive inputs (e.g., via a user) requesting additional considerations and/or requirements. For example, the system may receive requirements related to required technology stacks to use, declared performance characteristics and/or usage metrics that must be met, and/or localization requirements.

For example, the system may receive a requirement to use a particular technology stack. A technology stack may refer to a collection of software, protocols, and technologies that are used together to provide specific functionalities or services within the network. It represents the layers (e.g., physical layer, data link layer, network layer, transport layer, etc.) of software and components that work together to enable network communication and services. Based on the technology stack used, the system may adjust the recommendation network arrangement. For example, selecting the first subset of devices for serving the first application based on the first output may further comprise the system receiving a technology stack requirement for processing the first application and determining the first subset meets the technology stack requirement.

In another example, the system may receive a requirement to use a particular location for processing an application (e.g., due to regulatory compliance and/or other considerations). Localization refers to the process of identifying the physical location or geographical position of network devices, systems, or users within a network or the internet. Localization can be essential for various purposes, including network management, troubleshooting, security, and providing location-based services. Based on the localization requirement, the system may adjust the recommendation network arrangement. For example, selecting the first subset of devices for serving the first application based on the first output may further comprise the system receiving a localization requirement for processing the first application and determining the first subset meets the localization requirement.

At step 514, process 500 (e.g., using one or more components described above) generates a recommendation for the network arrangement. For example, the system may generate for display, on a user interface, the recommendation based on the first output. In some embodiments, the recommendation may comprise a prediction related to a past, current, and/or future use of power for one or more network arrangements. Additionally or alternatively, the system may express the prediction in terms of carbon impact and/or other value.

In some embodiments, the recommendation and/or its power consumption may be based on a type of power source powering the devices. For example, the system may account for the power consumption of different manners in which electricity for a given device is generated. For example, the system may determine a different power consumption for devices powered by solar or wind power from that of coal or nuclear power. That is, the system may determine an average or aggregate power consumption ratio for the power source (e.g., based on third-party information) and adjust the power consumption accordingly. For example, the system may determine a power source for powering the first subset and/or network arrangement. The system may determine the power consumption ratio for the power source. The system may adjust the carbon impact based on the power consumption ratio.

In some embodiments, the system may determine the type of power source based on a geographic location (or network location) of a power source. For example, the system may determine that a server farm is in a geographic location that is served by a particular power source (or a series of different power sources, which may be defined by a percentage). For example, the system may determine a geographic location for the first subset. The system may determine the power source based on the geographic location. In another example, the system may determine a network location for the first subset. The system may determine the power source based on the network location. Based on this information, the system may adjust the network arrangement used.

For example, the system may collect information around "cost" of power generation. "Cost" can be expressed in money but may also be expressed as power-mix value (share of green energy). In such cases, the system may select between two networks (e.g., two data centers in different locations). The two networks may both be equipped with wind energy sources and infrastructure ready to host an application. The system may assess the consequences of data/application migration between datacenters versus predicted safety on windy day in one of those. The system may also check the feasibility of such migration based on previously gathered data around infrastructure metrics.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing network arrangements for devices with non-homogeneous or unknown specifications based on power consumption for selected applications.

2. The method of any one of the preceding embodiments, further comprising: generating a network mapping for a first network, wherein the network mapping indicates relationships between a plurality of devices in the first network, and wherein each of the plurality of devices is represented by respective nodes in the network mapping, wherein the respective nodes comprise a first node subset and a second node subset, wherein the first node subset comprises nodes with respective known specifications, wherein the respective known specifications are based on respective vendor information, respective model information, respective serial number information, or respective geographical location information, wherein the second node subset comprises nodes with respective virtual specifications, and wherein the respective virtual specifications are inferred based on the relationships between the plurality of devices and the respective known specifications; and populating a device profile repository based on the network mapping.

3. The method of any one of the preceding embodiments, further comprising: receiving a first user request to generate a first network arrangement of a plurality of devices for a first application across a first network; determining a first usage metric for the first application, wherein the first usage metric requirement describes required metadata related to one or more processes performed by the first application; determining, from the plurality of devices, a plurality of subsets of devices for serving the first application; retrieving, from a device profile repository, respective device profiles corresponding to devices on the first network, wherein the device profile repository comprises a first set of device profiles corresponding to devices with known specifications and a second set of device profiles corresponding to devices with virtual specifications; determining, using a first model, a first output, wherein the first model is trained to generate application-specific power consumption predictions for respective applications based on inputted usage metrics for the respective applications and respective device profiles, from the device profile repository, for devices serving the respective applications; and generating for display, on a user interface, the recommendation based on the first output.

4. The method of any one of the preceding embodiments, wherein generating the device profile repository further comprises: retrieving an aggregate carbon impact for a first device and a second device; retrieving a first device profile for the first device, wherein the first device profile is based on a first known specification; determining a first component carbon impact for the first device based on the first known specification; determining a difference between the first component carbon impact and the aggregate carbon impact; determining a second component carbon impact for the second device based on the difference; and determining a second virtual specification for the second device based on the second component carbon impact.

5. The method of any one of the preceding embodiments, wherein generating the device profile repository further comprises: retrieving an aggregate processing metric for a first device and a second device; retrieving a first device profile for the first device, wherein the first device profile is based on a first known specification; determining a first component processing metric for the first device based on the first known specification; determining a difference between the first component processing metric and the aggregate processing metric; determining a second processing metric for the second device based on the difference; and determining a second virtual specification for the second device based on the second processing metric.

6. The method of any one of the preceding embodiments, wherein generating the device profile repository further comprises: retrieving a network mapping for the first network, wherein the network mapping indicates relationships between the plurality of devices, and wherein each of the plurality of devices is represented by respective nodes in the network mapping; identifying a first node subset of the respective nodes, wherein the first node subset comprises nodes with respective known specifications; generating a known network mapping based on populating the network mapping at each node of the first node subset with the respective known specifications; identifying a second node subset of the respective nodes, wherein the second node subset comprises nodes with respective unknown specifications, and wherein the second node subset comprises unpopulated nodes in the known network mapping; and inferring respective virtual specifications for each node in the second node subset based on the relationships between the plurality of devices and the respective known specifications in the known network mapping.

7. The method of any one of the preceding embodiments, wherein determining the first usage metric for the first application further comprises: determining a first process performed by the first application; and determining a data volume created on a data array for consumption by the first application during the first process.

8. The method of any one of the preceding embodiments, wherein determining the first usage metric for the first application further comprises: determining a first process performed by the first application; and determining watt-hour power consumption by the first application during the first process.

9. The method of any one of the preceding embodiments, wherein determining the first usage metric for the first application further comprises: determining a first process performed by the first application; and determining a number of ports for switches dedicated to the first application during the first process.

10. The method of any one of the preceding embodiments, wherein determining the first usage metric for the first application further comprises: determining a first process performed by the first application; and determining a number of data arrays created for the first application during the first process.

11. The method of any one of the preceding embodiments, wherein determining the first subset of devices for serving the first application based on the first usage metric further comprises: determining a number of devices of the plurality of devices required by the first application based on the first usage metric; and determining the first subset of devices based on the number of devices.

12. The method of any one of the preceding embodiments, wherein determining the first subset of devices for serving the first application based on the first usage metric further comprises: determining a first process performed by the first application based on the first usage metric; and filtering the plurality of devices based on whether a respective device is utilized during the first process.

13. The method of any one of the preceding embodiments, wherein determining the first output further comprises: determining a carbon impact for serving the first application with the first subset; and determining the recommendation based on the carbon impact.

14. The method of any one of the preceding embodiments, wherein determining the recommendation based on the carbon impact further comprises: determining a power source for powering the first subset; determining carbon impact ratio for the power source; and adjusting the carbon impact based on the carbon impact ratio.

15. The method of any one of the preceding embodiments, wherein determining the power source for powering the first subset further comprises: determining a geographic location for the first subset; and determining the power source based on the geographic location.

16. The method of any one of the preceding embodiments, wherein determining the power source for powering the first subset further comprises: determining a network location for the first subset; and determining the power source based on the network location.

17. The method of any one of the preceding embodiments, wherein determining the first output further comprises: generating a first feature input, wherein the first feature input is based on the first application and the first subset of devices; and inputting the first feature input into the first model, wherein the first model comprises an artificial intelligence model.

18. The method of any one of the preceding embodiments, further comprising: retrieving a network mapping for a first network, wherein the network mapping indicates relationships between a plurality of devices, and wherein each of the plurality of devices is represented by respective nodes in the network mapping; identifying a first node subset of the respective nodes, wherein the first node subset comprises nodes with respective known specifications; generating a known network mapping based on populating the network mapping at each node of the first node subset with the respective known specifications; identifying a second node subset of the respective nodes, wherein the second node subset comprises nodes with respective unknown specifications, and wherein the second node subset comprises unpopulated nodes in the known network mapping; inferring respective virtual specifications for each node in the second node subset based on the relationships between the plurality of devices and the respective known specifications in the known network mapping; generating a device profile repository based on populating the known network mapping with the respective virtual specifications for each node in the second node subset; receiving a first user request to generate a first network arrangement of a plurality of devices for a first application across a first network; determining, from the plurality of devices, a first subset of devices for serving the first application; retrieving, from the device profile repository, a first subset of device profiles corresponding to devices in the first subset of devices; and generating for display, on a user interface, the recommendation based on the first subset of device profiles.

19. The method of any one of the preceding embodiments, further comprising: receiving a first user request to generate a first network arrangement of a plurality of devices for a first application across a first network; determining a first usage metric requirement for the first application, wherein the first usage metric requirement describes required metadata related to one or more processes performed by the first application; determining, from the plurality of devices, a plurality of subsets of devices for serving the first application; retrieving, from a device profile repository, respective device profiles corresponding to devices on the first network, wherein the device profile repository comprises a first set of device profiles corresponding to devices with known specifications and a second set of device profiles corresponding to devices with virtual specifications; determining, using a first model, a first output, wherein the first model is trained to generate respective application-specific power consumption predictions for the plurality of subsets of devices based on inputted usage metric requirements and the respective device profiles; selecting, from the plurality of subsets of devices, a first subset of devices for serving the first application based on the first output; and generating a recommendation for the first network arrangement based on the first subset of devices.

20. The method of any one of the preceding embodiments, wherein generating the device profile repository further comprises: retrieving an aggregate power consumption for a first device and a second device; retrieving a first device profile for the first device, wherein the first device profile is based on a first known specification; determining a first component power consumption for the first device based on the first known specification; determining a difference between the first component power consumption and the aggregate power consumption; determining a second component power consumption for the second device based on the difference; and determining a second virtual specification for the second device based on the second component power consumption.

21. The method of any one of the preceding embodiments, wherein generating the device profile repository further comprises: retrieving an aggregate processing metric for a first device and a second device; retrieving a first device profile for the first device, wherein the first device profile is based on a first known specification; determining a first component processing metric for the first device based on the first known specification; determining a difference between the first component processing metric and the aggregate processing metric; determining a second processing metric for the second device based on the difference; and determining a second virtual specification for the second device based on the second processing metric.

22. The method of any one of the preceding embodiments, wherein generating the device profile repository further comprises: retrieving a network mapping for the first network, wherein the network mapping indicates relationships between the plurality of devices, and wherein each of the plurality of devices is represented by respective nodes in the network mapping; identifying a first node subset of the respective nodes, wherein the first node subset comprises nodes with respective known specifications; generating a known network mapping based on populating the network mapping at each node of the first node subset with the respective known specifications; identifying a second node subset of the respective nodes, wherein the second node subset comprises nodes with respective unknown specifications, and wherein the second node subset comprises unpopulated nodes in the known network mapping; and inferring respective virtual specifications for each node in the second node subset based on the relationships between the plurality of devices and the respective known specifications in the known network mapping.

23. The method of any one of the preceding embodiments, wherein determining the first subset of devices for serving the first application based on the output further comprises: determining a device type of a plurality of device types required by the first application based on the first usage metric; and determining the first subset of devices based on the device type.

24. The method of any one of the preceding embodiments, wherein determining the first subset of devices for serving the first application based on the first output further comprises: determining a first process performed by the first application based on the first usage metric; and filtering the plurality of device types based on whether a respective device type is utilized during the first process.

25. The method of any one of the preceding embodiments, wherein determining the device type of the plurality of device types required by the first application based on the first usage metric further comprises: retrieving a first device taxonomy for the first network, wherein the first device taxonomy indicates required device types corresponding to different usage metrics; and determining, based on the first device taxonomy, that the device type corresponds to the first usage metric.

26. The method of any one of the preceding embodiments, wherein determining the device type of the plurality of device types required by the first application based on the first output further comprises: determining a taxonomy identifier based on the first application; and selecting the first device taxonomy from a plurality of device taxonomies based on the taxonomy identifier.

27. The method of any one of the preceding embodiments, wherein selecting the first subset of devices for serving the first application based on the first output further comprises: receiving a localization requirement for processing the first application; and determining the first subset meets the localization requirement.

28. The method of any one of the preceding embodiments, wherein selecting the first subset of devices for serving the first application based on the first output further comprises: receiving a technology stack requirement for processing the first application; and determining the first subset meets the technology stack requirement.

29. The method of any one of the preceding embodiments, wherein determining the first output further comprises: determining a power consumption for serving the first application with the first subset; and determining the recommendation based on the carbon impact.

30. The method of any one of the preceding embodiments, wherein determining the recommendation based on the carbon impact further comprises: determining a power source for powering the first subset; determining power consumption ratio for the power source; and adjusting the power consumption based on the power consumption ratio.

31. The method of any one of the preceding embodiments, wherein determining the power source for powering the first subset further comprises: determining a geographic location for the first subset; and determining the power source based on the geographic location.

32. The method of any one of the preceding embodiments, wherein determining the power source for powering the first subset further comprises: determining a network location for the first subset; and determining the power source based on the network location.

33. The method of any one of the preceding embodiments, wherein the application-specific power consumption predictions comprise multidimensional data.

34. A non-transitory, machine-readable medium storing instructions that, when executed by a data processing apparatus, cause the data processing apparatus to perform operations comprising those of any of embodiments 1-33.

35. A system comprising one or more processors; and memory storing instructions that, when executed by the processors, cause the processors to effectuate operations comprising those of any of embodiments 1-33.

36. A system comprising means for performing any of embodiments 1-33.

We claim:

1. A system for providing network arrangements for devices, the system comprising:
one or more processors; and
a non-transitory, computer-readable medium comprising instructions recorded thereon that, when executed by the one or more processors, cause operations comprising:
receiving a first request to generate a first network arrangement of a plurality of devices for a first application across a first network;
determining a first usage metric requirement for the first application, wherein the first usage metric requirement describes required metadata related to one or more processes performed by the first application;
retrieving, from a device profile repository, respective device profiles corresponding to devices on the first network, wherein the device profile repository comprises a first set of device profiles corresponding to devices with known specifications and a second set of device profiles corresponding to devices with virtual specifications;
determining, using a first model, a first output, wherein the first model is trained to generate respective application-specific power consumption predictions for a plurality of subsets of devices based on inputted usage metric requirements and the respective device profiles; and
selecting, from the plurality of subsets of devices, a first subset of devices for serving the first application based on the first output.

2. A method for providing network arrangements for devices, the method comprising:
receiving a first request to generate a first network arrangement of a plurality of devices for a first application across a first network;
determining a first usage metric requirement for the first application, wherein the first usage metric requirement describes required metadata related to one or more processes performed by the first application;
retrieving, from a device profile repository, respective device profiles corresponding to devices on the first network, wherein the device profile repository comprises a first set of device profiles corresponding to devices with known specifications and a second set of device profiles corresponding to devices with virtual specifications;
determining, using a first model, a first output, wherein the first model is trained to generate respective application-specific power consumption predictions for a plurality of subsets of devices based on inputted usage metric requirements and the respective device profiles; and
selecting, from the plurality of subsets of devices, a first subset of devices for serving the first application based on the first output.

3. The method of claim 2, wherein generating the device profile repository further comprises:
retrieving an aggregate power consumption for a first device and a second device;
retrieving a first device profile for the first device, wherein the first device profile is based on a first known specification;
determining a first component power consumption for the first device based on the first known specification;
determining a difference between the first component power consumption and the aggregate power consumption;
determining a second component power consumption for the second device based on the difference; and
determining a second virtual specification for the second device based on the second component power consumption.

4. The method of claim 2, wherein generating the device profile repository further comprises:
retrieving an aggregate processing metric for a first device and a second device;
retrieving a first device profile for the first device, wherein the first device profile is based on a first known specification;
determining a first component processing metric for the first device based on the first known specification;
determining a difference between the first component processing metric and the aggregate processing metric;
determining a second processing metric for the second device based on the difference; and
determining a second virtual specification for the second device based on the second processing metric.

5. The method of claim 2, wherein generating the device profile repository further comprises:
retrieving a network mapping for the first network, wherein the network mapping indicates relationships between the plurality of devices, and wherein each of the plurality of devices is represented by respective nodes in the network mapping;

identifying a first node subset of the respective nodes, wherein the first node subset comprises nodes with respective known specifications;

generating a known network mapping based on populating the network mapping at each node of the first node subset with the respective known specifications;

identifying a second node subset of the respective nodes, wherein the second node subset comprises nodes with respective unknown specifications, and wherein the second node subset comprises unpopulated nodes in the known network mapping; and inferring respective virtual specifications for each node in the second node subset based on the relationships between the plurality of devices and the respective known specifications in the known network mapping.

6. The method of claim 2, wherein selecting the first subset of devices for serving the first application based on the first output further comprises:

determining a device type of a plurality of device types required by the first application based on the first usage metric requirement; and determining the first subset of devices based on the device type.

7. The method of claim 6, wherein selecting the first subset of devices for serving the first application based on the first output further comprises:

determining a first process performed by the first application based on the first usage metric requirement; and filtering the plurality of device types based on whether a respective device type is utilized during the first process.

8. The method of claim 7, wherein determining the device type of the plurality of device types required by the first application based on the first usage metric requirement further comprises:

retrieving a first device taxonomy for the first network, wherein the first device taxonomy indicates required device types corresponding to different usage metrics; and determining, based on the first device taxonomy, that the device type corresponds to the first usage metric requirement.

9. The method of claim 8, wherein determining the device type of the plurality of device types required by the first application based on the first output further comprises:

determining a taxonomy identifier based on the first application; and selecting the first device taxonomy from a plurality of device taxonomies based on the taxonomy identifier.

10. The method of claim 2, wherein selecting the first subset of devices for serving the first application based on the first output further comprises:

receiving a localization requirement for processing the first application; and determining the first subset of devices meets the localization requirement.

11. The method of claim 2, wherein selecting the first subset of devices for serving the first application based on the first output further comprises:

receiving a technology stack requirement for processing the first application; and determining the first subset of devices meets the technology stack requirement.

12. The method of claim 2, wherein determining the first output further comprises:

determining a power consumption for serving the first application with the first subset of devices; and determining a recommendation based on a carbon impact for the power consumption.

13. The method of claim 12, wherein determining the recommendation based on the carbon impact further comprises:

determining a power source for powering the first subset of devices;

determining power consumption ratio for the power source; and adjusting the power consumption based on the power consumption ratio.

14. The method of claim 13, wherein determining the power source for powering the first subset of devices further comprises:

determining a geographic location for the first subset of devices; and determining the power source based on the geographic location.

15. The method of claim 13, wherein determining the power source for powering the first subset of devices further comprises:

determining a network location for the first subset of devices; and determining the power source based on the network location.

16. The method of claim 2, wherein the respective application-specific power consumption predictions comprise multidimensional data.

17. One or more non-transitory, computer-readable mediums comprising instructions recorded thereon that, when executed by one or more processors, cause operations comprising:

receiving a first request to generate a first network arrangement of a plurality of devices for a first application across a first network;

determining a first usage metric requirement for the first application, wherein the first usage metric requirement describes required metadata related to one or more processes performed by the first application;

determining, from the plurality of devices, a plurality of subsets of devices for serving the first application;

retrieving, from a device profile repository, respective device profiles corresponding to devices on the first network, wherein the device profile repository comprises a first set of device profiles corresponding to devices with known specifications and a second set of device profiles corresponding to devices with virtual specifications;

determining, using a first model, a first output, wherein the first model is trained to generate respective application-specific power consumption predictions for the plurality of subsets of devices based on inputted usage metric requirements and the respective device profiles; and selecting, from the plurality of subsets of devices, a first subset of devices for serving the first application based on the first output.

18. The one or more non-transitory, computer-readable mediums of claim 17, wherein generating the device profile repository further comprises:

retrieving an aggregate power consumption for a first device and a second device;

retrieving a first device profile for the first device, wherein the first device profile is based on a first known specification;

determining a first component power consumption for the first device based on the first known specification;

determining a difference between the first component power consumption and the aggregate power consumption;

determining a second component power consumption for the second device based on the difference; and determining a second virtual specification for the second device based on the second component power consumption.

19. The one or more non-transitory, computer-readable mediums of claim 17, wherein generating the device profile repository further comprises:

retrieving an aggregate processing metric for a first device and a second device;

retrieving a first device profile for the first device, wherein the first device profile is based on a first known specification;

determining a first component processing metric for the first device based on the first known specification;

determining a difference between the first component processing metric and the aggregate processing metric;

determining a second processing metric for the second device based on the difference; and determining a second virtual specification for the second device based on the second processing metric.

20. The one or more non-transitory, computer-readable mediums of claim 17, wherein determining the first subset of devices for serving the first application based on the first output further comprises:

determining a device type of a plurality of device types required by the first application based on the first usage metric requirement; and determining the first subset of devices based on the device type.

* * * * *